(12) United States Patent
Chiu et al.

(10) Patent No.: US 10,379,431 B2
(45) Date of Patent: Aug. 13, 2019

(54) PROJECTION APPARATUS AND ILLUMINATION SYSTEM HAVING WAVELENGTH CONVERSION MODULES

(71) Applicant: Coretronic Corporation, Hsin-Chu (TW)

(72) Inventors: Hao-Wei Chiu, Hsin-Chu (TW); Ko-Shun Chen, Hsin-Chu (TW); Chi-Hsun Wang, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 14/753,034

(22) Filed: Jun. 29, 2015

(65) Prior Publication Data

US 2016/0004148 A1  Jan. 7, 2016

(30) Foreign Application Priority Data

Jul. 1, 2014 (CN) .......................... 2014 1 0308638

(51) Int. Cl.
G03B 21/20    (2006.01)
G03B 21/28    (2006.01)
G03B 33/08    (2006.01)

(52) U.S. Cl.
CPC ....... *G03B 21/204* (2013.01); *G03B 21/2013* (2013.01); *G03B 21/28* (2013.01); *G03B 33/08* (2013.01)

(58) Field of Classification Search
CPC ..... F21V 7/0016; F21V 9/08; G03B 21/2013; G03B 21/204
See application file for complete search history.

(56) References Cited

U.S. PATENT DOCUMENTS 7,710,669 B2 * 5/2010 Li ...................... G02B 27/1033
                                                     353/33
8,496,333 B2 * 7/2013 Wang ................. G02B 26/0833
                                                     353/84

(Continued)

FOREIGN PATENT DOCUMENTS

CN      102053468 A    5/2011
CN      103676428 A    3/2014

(Continued)

OTHER PUBLICATIONS

"Office Action of China Counterpart Application", dated Aug. 29, 2016, p. 1-p. 10.

(Continued)

*Primary Examiner* — Bao-Luan Q Le
(74) *Attorney, Agent, or Firm* — JCIPRNET

(57) ABSTRACT

A projection apparatus including an illumination system, a light valve, and an image-forming system is provided. The illumination system includes a first dichroic unit, a second dichroic unit, a third dichroic unit, two wavelength conversion modules, two light sources respectively emitting a first beam and a second beam, and an excitation light source module emitting an excitation beam. The first dichroic unit and the second dichroic unit are disposed on a transmission path of the excitation beam. The two wavelength conversion modules respectively convert the corresponding partial excitation beam coming from the first dichroic unit and the second dichroic unit into two converted beams. The light valve converts the first beam, the two converted beams, and the second beam coming from the third dichroic unit into an image beam. The image-forming system is disposed on a transmission path of the image beam.

23 Claims, 5 Drawing Sheets

(56) References Cited

U.S. PATENT DOCUMENTS

| | | | |
|---|---|---|---|
| 8,573,779 B2 | 11/2013 | Yamagishi et al. | |
| 8,646,947 B2* | 2/2014 | Li | H04N 9/3114 362/293 |
| 8,911,092 B2* | 12/2014 | Fujita | G03B 21/204 353/31 |
| 9,010,938 B2* | 4/2015 | Akiyama | G02B 27/142 353/34 |
| 9,033,518 B2* | 5/2015 | Pan | H04N 9/3117 353/82 |
| 9,131,165 B2* | 9/2015 | Takahashi | G02B 27/141 |
| 9,335,559 B2* | 5/2016 | Masuda | H04N 9/31 |
| 9,400,416 B2* | 7/2016 | Takahashi | G03B 21/142 |
| 2006/0126178 A1* | 6/2006 | Li | G02B 27/1033 359/489.09 |
| 2009/0195707 A1* | 8/2009 | Mizushima | H04N 9/3111 348/744 |
| 2010/0118276 A1* | 5/2010 | Li | G02B 27/1033 353/33 |
| 2011/0234923 A1* | 9/2011 | Yamagishi | G03B 21/204 348/757 |
| 2011/0261326 A1* | 10/2011 | Wang | G02B 26/0833 353/31 |
| 2011/0279782 A1* | 11/2011 | Huang | H04N 9/3111 353/31 |
| 2012/0026469 A1* | 2/2012 | Akiyama | G02B 27/142 353/20 |
| 2012/0051044 A1* | 3/2012 | Akiyama | G03B 21/2013 362/233 |
| 2012/0105811 A1 | 5/2012 | Huang | |
| 2012/0162614 A1* | 6/2012 | Kobayashi | H04N 9/3164 353/31 |
| 2012/0300178 A1* | 11/2012 | Sugiyama | H04N 9/3111 353/31 |
| 2013/0003368 A1* | 1/2013 | Li | H04N 9/3114 362/231 |
| 2013/0010264 A1* | 1/2013 | Takahashi | H04N 9/3114 353/20 |
| 2013/0021582 A1* | 1/2013 | Fujita | G03B 21/204 353/31 |
| 2013/0070205 A1* | 3/2013 | Pan | H04N 9/3117 353/31 |
| 2013/0107226 A1* | 5/2013 | Aksenov | H04N 9/315 353/31 |
| 2013/0135592 A1* | 5/2013 | Okuda | F21V 13/00 353/31 |
| 2013/0163225 A1* | 6/2013 | Nakatsu | G03B 21/204 362/84 |
| 2013/0222772 A1 | 8/2013 | Matsubara | |
| 2013/0242264 A1* | 9/2013 | Saitou | G03B 21/2013 353/20 |
| 2013/0242533 A1* | 9/2013 | Li | F21V 9/16 362/84 |
| 2013/0271954 A1* | 10/2013 | Li | H04N 9/3114 362/84 |
| 2014/0071407 A1* | 3/2014 | Takahashi | G03B 21/142 353/31 |
| 2014/0071408 A1* | 3/2014 | Takahashi | G02B 27/141 353/31 |
| 2014/0176916 A1* | 6/2014 | Masuda | H04N 9/31 353/38 |
| 2014/0211170 A1* | 7/2014 | Kitano | G03B 21/204 353/31 |
| 2014/0347634 A1* | 11/2014 | Bommerbach | H04N 9/3158 353/31 |
| 2015/0062540 A1* | 3/2015 | Mehl | H04N 9/3111 353/31 |
| 2015/0167907 A1* | 6/2015 | Hoehmann | G03B 21/204 362/84 |
| 2015/0167932 A1* | 6/2015 | Yamada | G02B 27/102 362/19 |

FOREIGN PATENT DOCUMENTS

| | | |
|---|---|---|
| JP | 2006215558 | 8/2006 |
| JP | 2010286521 A | 12/2010 |
| JP | 2012168507 | 9/2012 |
| JP | 2012185402 | 9/2012 |
| JP | 2013076968 | 4/2013 |
| JP | 2013101317 | 5/2013 |
| JP | 2013178290 | 9/2013 |
| JP | 2014053179 | 3/2014 |
| WO | 2014010479 | 1/2014 |
| WO | 2014038434 | 3/2014 |

OTHER PUBLICATIONS

"Office Action of Japan Counterpart Application", dated Sep. 15, 2015, p. 1-p. 4.

* cited by examiner

PROJECTION APPARATUS AND ILLUMINATION SYSTEM HAVING WAVELENGTH CONVERSION MODULES

CROSS-REFERENCE TO RELATED APPLICATION

This application claims the priority benefit of China application serial no. 201410308638.1, filed on Jul. 1, 2014. The entirety of the above-mentioned patent application is hereby incorporated by reference herein and made a part of this specification.

BACKGROUND

Technical Field

The invention relates to an imaging apparatus and an optical system, and particularly relates to a projection apparatus and an illumination system.

Related Art

Along with development of optical technology, light-emitting diodes (LEDs) and laser diodes (LDs) of a solid-state lighting technique are widely used as light sources of projectors, where the LDs provide lights with higher intensity to serve as the light source of the projector compared with that of the LEDs.

To use a high intensity laser beam emitted by the LD to excite a phosphor conversion module is one of common techniques of applying the LD as a light source, and the high intensity laser light is used to excite different phosphors on the phosphor conversion module to obtain excited lights of different colors to serve as the light source of the projector. Today, people have increasing demand on brightness of images projected by the projector, and an LD array with higher intensity is required to emit light with higher intensity. However, when the intensity of the light irradiating the phosphor is too high, a conversion efficiency of the phosphor is accordingly decreased. U.S. Pat. No. 8,573,779 discloses an illumination apparatus, which has a plurality of light sources respectively irradiating different parts of a light integrator. U.S. Patent Publication No. 20120300178 discloses an illumination apparatus and a projective display apparatus.

The information disclosed in this "BACKGROUND" section is only for enhancement of understanding of the background of the described technology and therefore it may contain information that does not form the prior art that is already known to a person of ordinary skill in the art. Further, the information disclosed in this "BACKGROUND" section does not mean that one or more problems to be solved by one or more embodiments of the invention was acknowledged by a person of ordinary skill in the art.

SUMMARY

The invention is directed to a projection apparatus, which is capable of providing high brightness images.

The invention is directed to an illumination system, the illumination system is capable of providing a high brightness light source, and a wavelength conversion module maintains a good wavelength conversion efficiency.

An embodiment of the intention provides a projection apparatus including an illumination system, a light valve, and an image-forming system. The illumination system includes a first light source, an excitation light source module, a first dichroic unit, a second dichroic unit, a first wavelength conversion module, a second wavelength conversion module, a second light source, and a third dichroic unit. The first light source emits a first beam, and the excitation light source module emits an excitation beam. The first dichroic unit and the second dichroic unit are disposed on a transmission path of the excitation beam. The first dichroic unit is further disposed on a transmission path of the first beam, and the second dichroic unit is further disposed on a transmission path of the first beam coming from the first dichroic unit. The first wavelength conversion module is disposed on a transmission path of a first partial beam of the excitation beam coming from the first dichroic unit, and converts the first partial beam into a first converted beam transmitted back to the first dichroic unit. The second dichroic unit is further disposed on a transmission path of the first converted beam coming from the first dichroic unit. The second wavelength conversion module is disposed on a transmission path of a second partial beam of the excitation beam coming from the second dichroic unit, and converts the second partial beam into a second converted beam transmitted back to the second dichroic, unit. The second light source emits a second beam. The third dichroic unit is disposed on transmission paths of the second beam and the first beam, the first converted beam, and the second converted beam coming from the second dichroic unit. The light valve converts the first beam, the first converted beam, the second converted beam, and the second beam coming from the third dichroic unit into an image beam. The image-forming system is disposed on a transmission path of the image beam.

An embodiment of the invention provides an illumination system including a first light source, an excitation light source module, a first dichroic unit, a second dichroic unit, a first wavelength conversion module, a second wavelength conversion module, a second light source, and a third dichroic unit. The first light source emits a first beam, and the excitation light source module emits an excitation beam. The first dichroic unit and the second dichroic unit are disposed on a transmission path of the excitation beam. The first dichroic unit is further disposed on a transmission path of the first beam, and the second dichroic unit is further disposed on a transmission path of the first beam coming from the first dichroic unit. The first wavelength conversion module is disposed on a transmission path of a first partial beam of the excitation beam coming from the first dichroic unit, and converts the first partial beam into a first converted beam transmitted back to the first dichroic unit. The second dichroic unit is further disposed on a transmission path of the first converted beam coming from the first dichroic unit. The second wavelength conversion module is disposed on a transmission path of a second partial beam of the excitation beam coming from the second dichroic unit, and converts the second partial beam into a second converted beam transmitted back to the second dichroic unit. The second light source emits a second beam. The third dichroic unit is disposed on transmission paths of the second beam and the first beam, the first converted beam, and the second converted beam coming from the second dichroic unit.

In an embodiment of the invention, the excitation light source module includes a first excitation light source and a second excitation light source. The first excitation light source emits the first partial beam of the excitation beam, and the first dichroic unit is disposed on a transmission path of the first partial beam. The second excitation light source emits the second partial beam of the excitation beam, and the second dichroic unit is disposed on a transmission path of the second partial beam.

In an embodiment of the invention, the excitation light source module includes an excitation light source, a beam splitting unit, and a reflecting unit. The excitation light source emits the excitation beam. The beam splitting unit is disposed on the transmission path of the excitation beam, and splits the excitation beam into the first partial beam and the second partial beam. The second dichroic unit is disposed on a transmission path of the second partial beam coming from the beam splitting unit. The reflecting unit is disposed on a transmission path of the first partial beam coming from the beam splitting unit, and reflects the first partial beam coming from the beam splitting unit to the first dichroic unit.

In an embodiment of the invention, a part of the excitation beam reflected by the beam splitting unit becomes the first partial beam, and a part of the excitation beam passing through the beam splitting unit becomes the second partial beam.

In an embodiment of the invention, the second dichroic unit splits the excitation beam into the first partial beam and the second partial beam, and the first dichroic unit is further disposed on a transmission path of the first partial beam coming from the second dichroic unit.

In an embodiment of the invention, the first beam sequentially passes through the first dichroic unit, the second dichroic unit, and the third dichroic unit. The first converted beam is first reflected by the first dichroic unit and sequentially passes through the second dichroic unit and the third dichroic unit. The second converted beam is reflected by the second dichroic unit and then passes through the third dichroic unit. The second beam is reflected by the third dichroic unit.

In an embodiment of the invention, the first partial beam passes through the first dichroic unit and is then transmitted to the first wavelength conversion module, and the second partial beam passes through the second dichroic unit and is then transmitted to the second wavelength conversion module.

In an embodiment of the invention, a part of the excitation beam reflected by the second dichroic unit becomes the first partial beam, and the first partial beam is reflected to the first wavelength conversion module by the first dichroic unit. A part of the excitation beam passing through the second dichroic unit becomes the second partial beam transmitted to the second wavelength conversion module.

In an embodiment of the invention, the first light source, the excitation light source module, and the second light source are laser light sources with different lighting wavelengths.

In an embodiment of the invention, the first wavelength conversion module and the second wavelength conversion module are phosphor wheels with different colors of phosphors.

In an embodiment of the invention, the first beam is a first blue beam, the excitation beam is a second blue beam, and a wavelength of the first blue beam is different from a wavelength of the second blue beam. One of the first converted beam and the second converted beam is a green beam, the other one of the first converted beam and the second converted beam is a yellow beam, and the second beam is a red beam.

In an embodiment of the invention, the third dichroic unit combines the first beam, the first converted beam, the second converted beam, and the second beam.

In an embodiment of the invention, the illumination system further includes a light uniforming element disposed on transmission paths of the first beam, the first converted beam, the second converted beam, and the second beam coming from the third dichroic unit.

According to the above descriptions, in the illumination system provided by the embodiment of the invention, by using a plurality of dichroic units and a plurality of wavelength conversion modules, while intensity of the light beam provided by the illumination system is enhanced, intensities of the light beams irradiating the wavelength conversion modules are avoided to be excessively high, so as to improve the quality of the light beam provided by the illumination system. By using the aforementioned illumination system, the projection apparatus according to the embodiments of the invention may provide images with high brightness and high quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to." Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
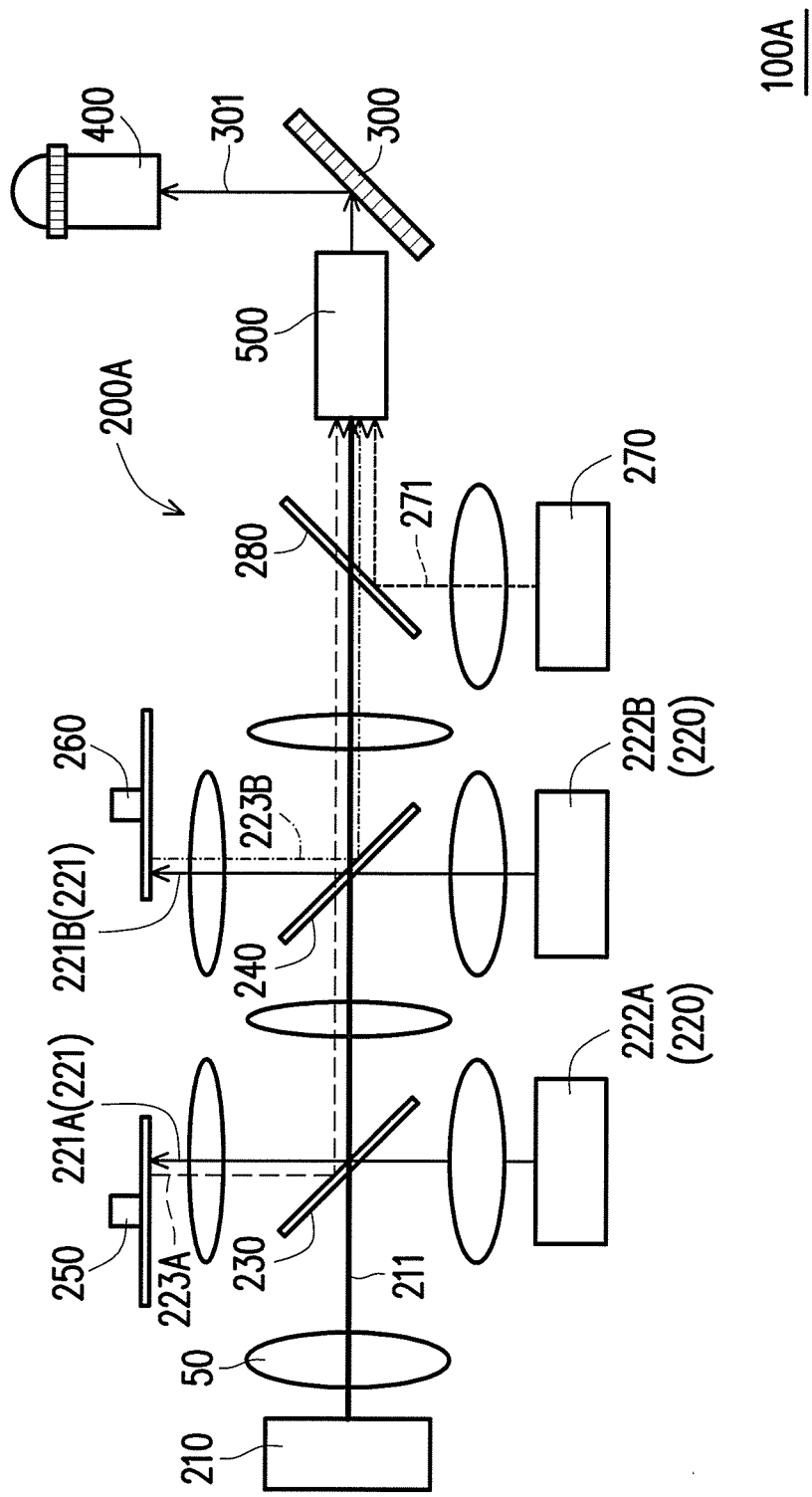
FIG. 1 is a schematic diagram of a projection apparatus according to a first embodiment of the invention.

Referring to FIG. 1, in the first embodiment of the invention, the projection apparatus 100A includes an illumination system 200A, a light valve 300, and an image-forming system 400. The illumination system 200A includes a first light source 210, an excitation light source module 220, a first dichroic unit 230, a second dichroic unit 240, a first wavelength conversion module 250, a second wavelength conversion module 260, a second light source 270, and a third dichroic unit 280. The first light source 210 emits a first beam 211, and the excitation light source module 220 emits an excitation beam 221. The first dichroic unit 230 and the second dichroic unit 240 are disposed on a transmission path of the excitation beam 221. The first dichroic unit 230 is further disposed on a transmission path of the first beam 211, and the second dichroic unit 240 is further disposed on a transmission path of the first beam 211 coming from the first dichroic unit 230. The first wavelength conversion module 250 is disposed on a transmission path of a first partial beam 221A of the excitation beam 221 coming from the first dichroic unit 230, and converts the first partial beam 221A into a first converted beam 223A transmitted back to the first dichroic unit 230. The second dichroic unit 240 is further disposed on a transmission path of the first converted beam 223A coming from the first dichroic unit 230.

The second wavelength conversion module 260 is disposed on a transmission path of a second partial beam 221B of the excitation beam 221 coming from the second dichroic unit 240, and converts the second partial beam 221B into a second converted beam 223B transmitted back to the second dichroic unit 240. The second light source 270 emits a second beam 271, and the third dichroic unit 280 is disposed on transmission paths of the second beam 271 and the first beam 211, the first converted beam 223A, and the second converted beam 223B coming from the second dichroic unit 240. The first beam 211, the first converted beam 223A, the second converted beam 223B, and the second beam 271 are transmitted to the light valve 300 through the aforementioned elements. In the embodiment, the first wavelength conversion module 250 and the second wavelength conversion module 260 are, for example, phosphor conversion modules with different colors of phosphors, and the excitation beam 221 excites the phosphors of the first wavelength conversion module 250 and the second wavelength conversion module 260 to correspondingly generate the first converted beam 223A and the second converted beam 223B with different colors.

In other words, referring to FIG. 1, in the illumination system 200A of the first embodiment of the invention, the first beam 211 sequentially passes through the first dichroic unit 230, the second dichroic unit 240, the third dichroic unit 280 to reach the light valve 300. In the embodiment, the first partial beam 221A passes through the first dichroic unit 230 to reach the first wavelength conversion module 250 for converting into the first converted beam 223A, and the first converted beam 223A is first reflected by the first dichroic unit 230 and then sequentially passes through the second dichroic unit 240 and the third dichroic unit 280 to reach the light valve 300. In the embodiment, the second partial beam 221B passes through the second dichroic unit 240 to reach the second wavelength conversion module 260 for converting into the second converted beam 223B, and the second converted beam 223B is reflected by the second dichroic unit 240 and then passes through the third dichroic unit 280 to reach the light valve 300. In the embodiment, the second beam 271 is reflected by the third dichroic unit 280 to reach the light valve 300. Namely, in the embodiment, the first dichroic unit 230 is pervious to the first beam 211 and the first partial beam 221A (i.e., the first beam 211 and the first partial beam 221A are adapted to pass through the first dichroic unit 230), and is adapted to reflect the first converted beam 223A; the second dichroic unit 240 is pervious to the first beam 211, the second partial beam 221B, and the first converted beam 223A (i.e., the first beam 211, the second partial beam 221B, and the first converted beam 223A are adapted to pass through the second dichroic unit 240), and is adapted to reflect the second converted beam 223B; and the third dichroic unit 280 is pervious to the first beam 211, the first converted beam 223A, and the second converted beam 223B (i.e., the first beam 211, the first converted beam 223A, and the second converted beam 223B are adapted to pass through the third dichroic unit 280), and is adapted to reflect the second beam 271.

Referring to FIG. 1, according to the above description, it is known that in the first embodiment, the first wavelength conversion module 250 and the second wavelength conversion module 260 are respectively excited by the first partial beam 221A and the second partial beam 221B, and the excited first converted beam 223A and the excited second converted beam 223B may have higher brightness. To be specific, since the illumination system 200A of the embodiment has two wavelength conversion modules (i.e., the first wavelength conversion module 250 and the second wavelength conversion module 260), light energy of the beam (i.e., the first partial beam 221A and the second partial beam 221B) emitted by the excitation light source module 220 is distributed to the two wavelength conversion modules. In this way, a situation that excessive light energy is focused on the same wavelength conversion module to cause degradation of the wavelength conversion efficiency of the wavelength conversion module due to overheat is avoided, and damage of the wavelength conversion module due to excessive heat energy is avoided. Further, since the light energy received by the two wavelength conversion modules in a unit time may be kept in an appropriate situation, a good wavelength conversion efficiency of each of the two wavelength conversion modules is maintained, and a whole light intensity of the light reaching the light valve 300 is thus relatively high. According to another aspect, the light energy normally received (which refers to that the light intensity does not produce excessive heat to degrade the wavelength conversion efficiency) by two wavelength conversion modules within a unit time is higher than the light energy normally received by one wavelength conversion module within the unit time, such that after the first converted beam 223A and the second converted beam 223B are produced, light energy of the two converted beams is relatively high. Namely, a whole brightness of the first converted beam 223A and the second converted beam 223B is higher than a brightness of a converted beam excited by a single wavelength conversion module.

To be specific, in the first embodiment, the first wavelength conversion module 250 and the second wavelength conversion module 260 are, for example, respectively a phosphor conversion module. Through the excitation light source module 220 emitting beams to respectively excite the phosphors on the first wavelength conversion module 250 and the second wavelength conversion module 260, the first wavelength conversion module 250 and the second wavelength conversion module 260 may respectively produce the first converted beam 223A and the second converted beam 223B through good wavelength conversion efficiency, such that the whole light intensity of the light received by the light valve 300 is enhanced. Namely, in the embodiment, the phosphors on the first wavelength conversion module 250 and the second wavelength conversion module 260 may avoid degradation of the conversion efficiency due to overheat caused by excessively high light intensity, such that the above two wavelength conversion modules are used to avoid burn (or burn mark) of the phosphor to spoil the phosphor.

To be specific, referring to FIG. 1, in the first embodiment, the light valve 300 converts the first beam 211, the first converted beam 223A, the second converted beam 223B, and the second beam 271 coming from the third dichroic unit 280 into an image beam 301. The image-forming system 400 is disposed on a transmission path of the image beam 301. Therefore, in the projection apparatus 100A of the embodiment, the beam generated by the high brightness and high quality light source of the illumination system 200A is converted by the light valve 300 to generate image beam 301 having the high brightness, and after the image beam 301 is transmitted to the image-forming system 400, the image-forming system 400 projects an image with high brightness on a screen. Moreover, in the embodiment, since two wavelength conversion modules (the first wavelength conversion module 250 and the second wavelength conversion module 260) are used, the situation of the conventional technique that the conversion efficiency of the phosphor is decreased or the phosphor is damaged due to using only one wavelength conversion module is avoided. In the embodiment, the light valve 300 is, for example, a digital micro-mirror device (DMD), a liquid-crystal-on silicon panel (LCOS panel) or a liquid crystal display panel (LCD panel), though the invention is not limited thereto. In the embodiment, the image-forming system 400 is, for example, a projection lens, though the invention is not limited thereto.

Moreover, the illumination system 200A of the embodiment may adjust a brightness difference or a color difference of the first converted beam 223A and the second beam 223B through the two wavelength conversion modules (i.e., the first wavelength conversion module 250 and the second wavelength conversion module 260). For example, by adjusting energy distribution of a spectrum converted by the first wavelength conversion module 250 and/or the second wavelength conversion module 260, a color proportion of the converted beam is adjusted. In this way, the color proportion of the image beam provided by the projection apparatus 100A may be adjusted, such that the projection apparatus 100A may be applied to a plurality of usage environments and situations.

It should be noticed that in the illumination system of the embodiment of the invention, optical properties of the first dichroic unit 230, the second dichroic unit 240, and the third dichroic unit 280 are not limited to the aforementioned optical properties. In other embodiments, the first dichroic unit 230 is adapted to reflect the first beam 211 and the first partial beam 221A, and is pervious to the first converted beam 223A. In other embodiments, the second dichroic unit 240 is adapted to reflect the first beam 211, the first partial beam 221A, and the first converted beam 223A, and is pervious to the second converted beam 223B. In other embodiments, the third dichroic unit 280 is adapted to reflect the first beam 211, the first converted beam 223A, and the second converted beam 223B, and is pervious to the second beam 271. Namely, the illumination system 200A of the invention may be configured with the aforementioned components according to an actual requirement, and the optical properties of the dichroic units and positions of the other components relative to the dichroic units may be suitably adjusted according to the selected dichroic units without influencing quality and brightness of the beams provided by the dichroic units.

Referring to FIG. 1, in the first embodiment of the invention, the illumination system 200A further includes a light uniforming element 500 disposed on transmission paths of the first beam 211, the first converted beam 223A, the second converted beam 223B, and the second beam 271 coming from the third dichroic unit 280. Furthermore, in the embodiment, the third dichroic unit 280 combines the first beam 211, the first converted beam 223A, the second converted beam 223B, and the second beam 271 and further transmits the beams mentioned above to the light uniforming element 500. In the embodiment, the light uniforming element 500 is, for example, a light integration rod, though the invention is not limited thereto. In other embodiments, the light uniforming element 500 may also be a lens array.

To be specific, referring to FIG. 1, in the first embodiment of the invention, the excitation light source module 220 includes a first excitation light source 222A and a second excitation light source 222B. The first excitation light source 222A emits the first partial beam 221A of the excitation beam 221, and the first dichroic unit 230 is disposed on the transmission path of the first partial beam 221A. The second excitation light source 222B emits the second partial beam 221B of the excitation beam 221, and the second dichroic unit 240 is disposed on the transmission path of the second partial beam 221B. Namely, in the embodiment, the first wavelength conversion module 250 is excited by the first partial beam 221A emitted by the first excitation light source 222A, and the second wavelength conversion module 260 is excited by the second partial beam 221B emitted by the second excitation light source 222B; i.e., two excitation light sources (i.e., the first excitation light source 222A and the second excitation light source 222B) are respectively used to provide the excitation beams to excite two beams, such that brightness of the excited first converted beam 223A and the excited second converted beam 223B is relatively high.

Referring to FIG. 1, in the first embodiment of the invention, the first light source 210, the excitation light source module 220 (i.e., the first excitation light source 222A and the second excitation light source 222B), and the second light source 270 are laser light sources with different lighting wavelengths. Further, in the embodiment, the first beam 211 is a first blue beam, the excitation beam 221 is a second blue beam, and a wavelength of the first blue beam is different from a wavelength of the second blue beam, though the invention is not limited thereto. In the embodiment, one of the first converted beam 223A and the second converted beam 223B (for example, the first converted beam 223A) is a green beam, the other one of the first converted beam 223A and the second converted beam 223B (for example, the second converted beam 223B) is a yellow beam, and the second beam 271 is a red beam, though the invention is not limited thereto. Moreover, in the embodiment, the first light source 210, the excitation light source module 220 (i.e., the first excitation light source 222A and the second excitation light source 222B), and the second light source 270 are, for example, laser diodes with different lighting wavelengths: the first beam 211 emitted by the first light source 210 is, for example, a laser beam with a wavelength of 462 nm, the excitation beam 221 emitted by the excitation light source module 220 is, for example, a laser beam with a wavelength of 448 nm, and the second beam 271 emitted by the second light source 270 is, for example, a red laser beam, though the invention is not limited thereto.

Figure 2A:
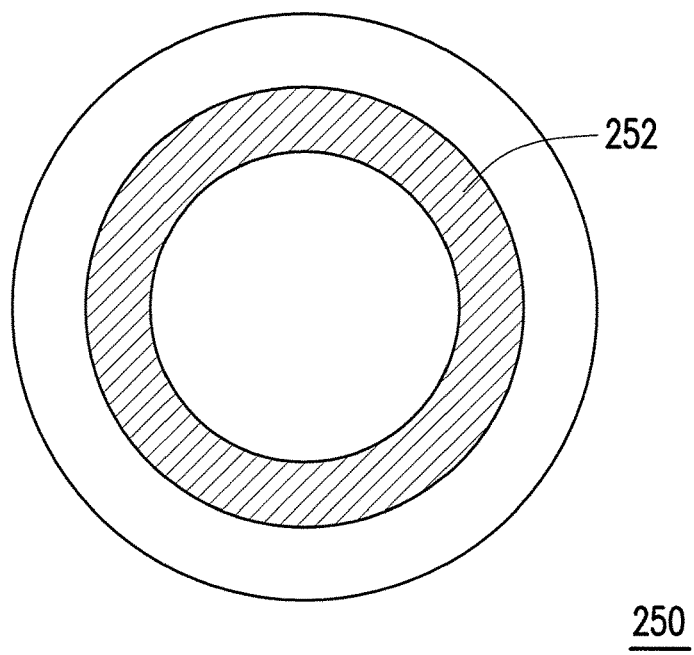
FIG. 2A and FIG. 2B are top views of a first wavelength conversion module and a second wavelength conversion module according to an embodiment of the invention.
Figure 2B:
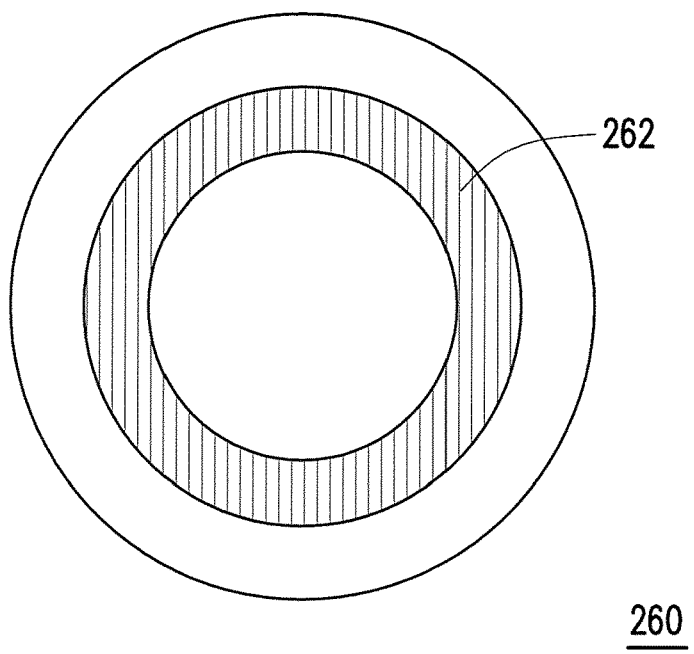
Figure 3A:
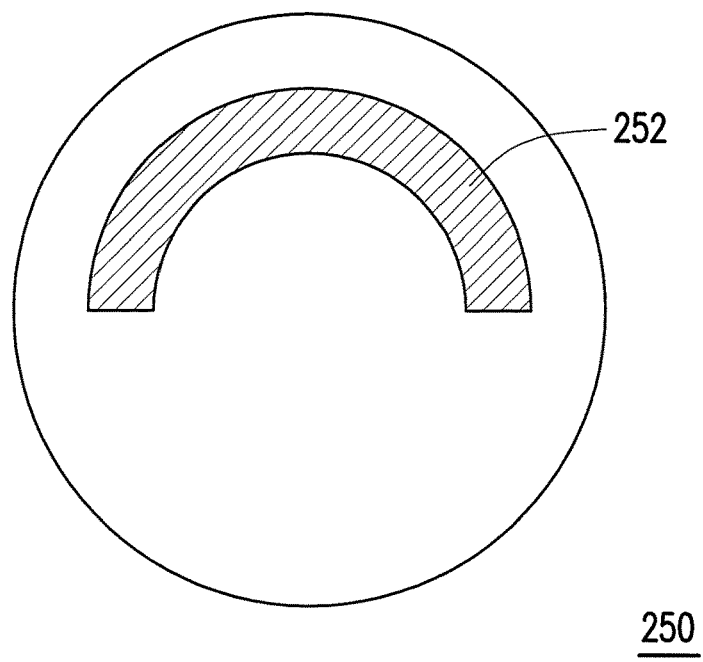
FIG. 3A and FIG. 3B are top views of a first wavelength conversion module and a second wavelength conversion module according to another embodiment of the invention.
Figure 3B:
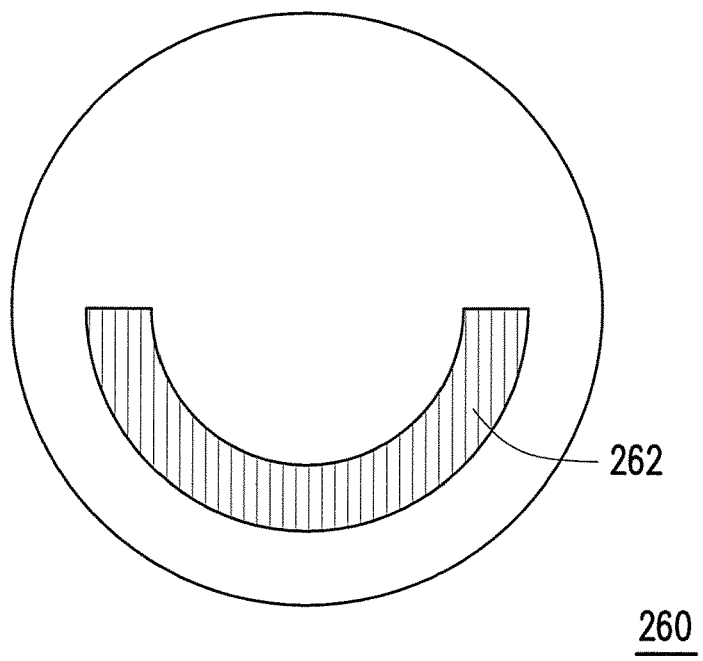

In detail, referring to FIG. 1, in the first embodiment of the invention, the first wavelength conversion module 250 and the second wavelength conversion module 260 are phosphor wheels with different phosphor colors. To be specific, referring to FIG. 1, FIG. 2A and FIG. 2B, the first wavelength conversion module 250, for example, has a phosphor layer 252, and the second wavelength conversion module 260, for example, has a phosphor layer 262. A color of the phosphor layer 252 is different from a color of the phosphor layer 262. The first partial beam 221A and the second partial beam 221B are respectively transmitted to the phosphor layer 252 and the phosphor layer 262, and the phosphor layer 252 and the phosphor layer 262 respectively excite the first converted beam 223A and the second converted beam 223B of different colors.

Referring to FIG. 2A to FIG. 3B, in the first embodiment of the invention, the phosphor layer 252 and the phosphor layer 262, for example, respectively have a ring shape, though the invention is not limited thereto. In other embodiments, the phosphor layer 252 and the phosphor layer 262 may respectively have an arc shape, and by respectively disposing the phosphor layer 252 and the phosphor layer 262 in the first wavelength conversion module 250 and the second wavelength conversion module 260, a time point/timing of exciting the first converted beam 223A is different from a time point/timing of exciting the second converted beam 223B, such that time allocation of the beams of different colors provided by the illumination system 200A are more flexible.

It should be noticed that in following descriptions of the other embodiments, components the same or similar to the components of the aforementioned embodiment are denoted by the same or similar referential numbers for clarity's sake, which is not intent to limit the invention.

Figure 4:
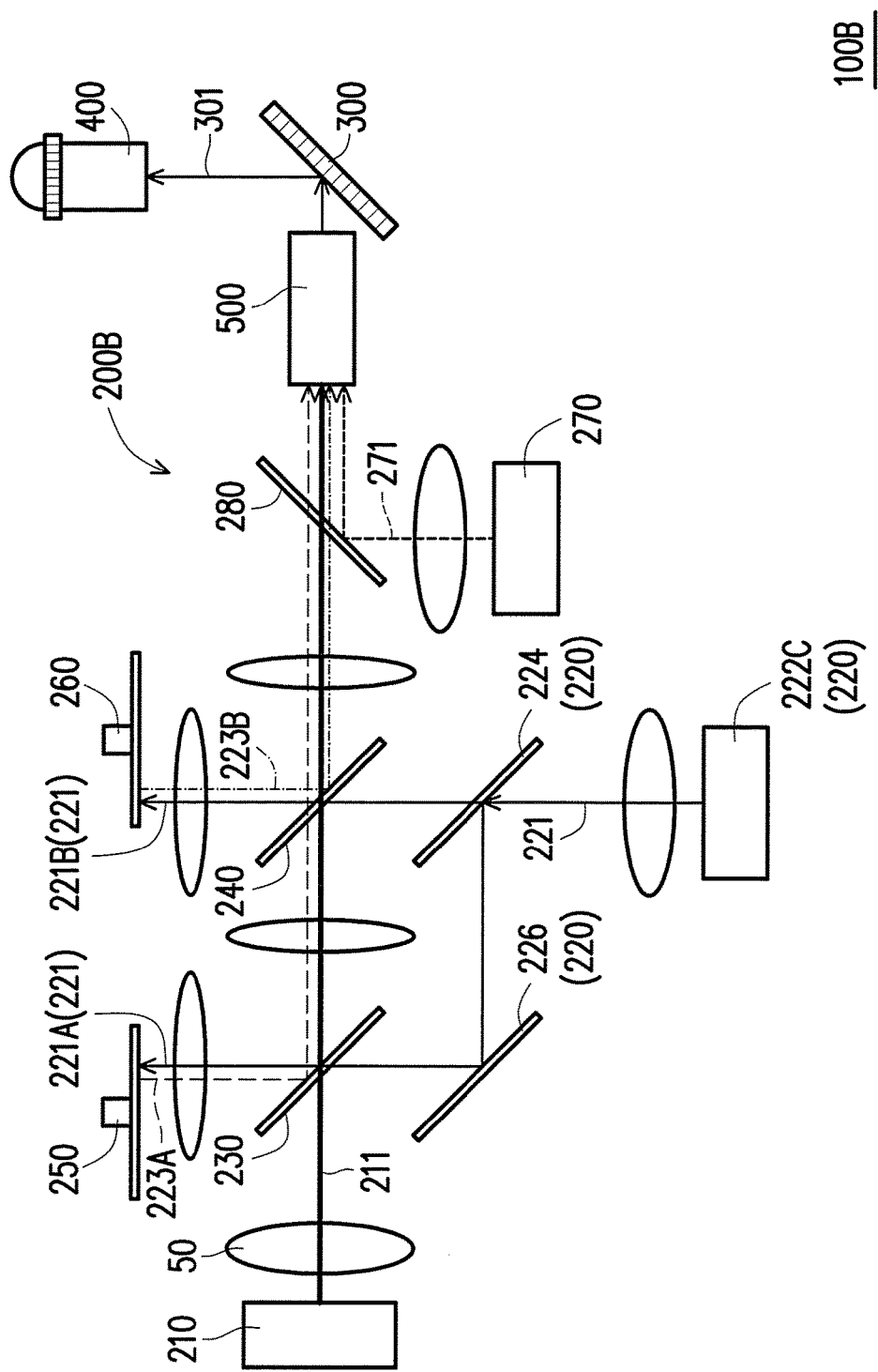
FIG. 4 is a schematic diagram of a projection apparatus according to a second embodiment of the invention.

Referring to FIG. 4, in the second embodiment of the invention, the projection apparatus 100B is similar to the aforementioned projection apparatus 100A, an illumination system 200B is similar to the aforementioned illumination system 200A, and a difference therebetween is that in the embodiment, the excitation light source module 220 includes an excitation light source 222C, a beam splitting unit 224, and a reflecting unit 226. In the embodiment, the excitation light source 222C emits the excitation beam 221; the beam splitting unit 224 is disposed on a transmission path of the excitation beam 221, and splits the excitation beam 221 into the first partial beam 221A and the second partial beam 221B; the second dichroic unit 240 is disposed on a transmission path of the second partial beam 221B coming from the beam splitting unit 224. The reflecting unit 226 is disposed on a transmission path of the first partial beam 221A coming from the beam splitting unit 224, and reflects the first partial beam 221A coming from the beam splitting unit 224 to the first dichroic unit 230.

In other words, referring to FIG. 4, in the illumination system 200B of the second embodiment of the invention, a part of the excitation beam 221 passes through the beam splitting unit 224 to form the second partial beam 221B, and the other part of the excitation beam 221 is reflected by the beam splitting unit 224 to form the first partial beam 221A. Then, the first partial beam 221A is reflected by the reflecting unit 226 and then passes through the first dichroic unit 230 to reach the first wavelength conversion module 250, and is then converted into the first converted beam 223A. Namely, in the embodiment, the beam splitting unit 224 is adapted to split the excitation beam 221 into the first partial beam 221A and the second partial beam 221B, and respectively transmit the first partial beam 221A and the second partial beam 221B towards different directions. However, the process that the beam splitting unit 224 splitting the excitation beam 221 into the first partial beam 221A and the second partial beam 221B is not limited to the aforementioned description related to penetration or reflection.

In other embodiments of the invention, the beam splitting unit 224 is pervious to a part of the excitation beam 221 to fo the first partial beam 221A, and reflects the other part of the excitation beam 221 to form the second partial beam 221B; the reflecting unit 226 is disposed on the transmission path of the first partial beam 221A coming from the beam splitting unit 224, and reflects the first partial beam 221A coming from the beam splitting unit 224 to the first dichroic unit 230; and the second dichroic unit 240 is disposed on the transmission path of the second partial beam 221B coming from the beam splitting unit 224.

In another embodiment of the invention, the beam splitting unit 224 is pervious to a part of the excitation beam 221 to form the first partial beam 221A, and reflects the other part of the excitation beam 221 to form the second partial beam 221B; the reflecting unit 226 is disposed on the transmission path of the second partial beam 221B coming from the beam splitting unit 224, and reflects the second partial beam 221B coming from the beam splitting unit 224 to the second dichroic unit 240; and the first dichroic unit 230 is disposed on the transmission path of the first partial beam 221A coming from the beam splitting unit 224.

According to the above descriptions, it is known that in the embodiment of the invention, the first partial beam 221A and the second partial beam 221B are not limited to the excitation beam 221 passing through the beam splitting unit 224 or the excitation beam 221 reflected by the beam splitting unit 224, and the reflecting unit 226 is not limited to be disposed on the transmission path of the first partial beam 221A or the second partial beam 221B, and a designer may suitably change relative positions of the above components according to an actual design requirement.

Referring to FIG. 4, according to the above descriptions, it is known that in the second embodiment of the invention, the excitation light source 222C in the illumination system 200B may emit the excitation beam 221 with higher intensity, and the excitation beam 221 is split into two parts (i.e., the first partial beam 221A and the second partial beam 221B) through the beam splitting unit 224 and the reflecting unit 226, such that intensities of the first partial beam 221A and the second partial beam 221B respectively transmitted to the first wavelength conversion module 250 and the second wavelength conversion module 260 are avoided to be too high. In this way, decrease of the conversion efficiency of the phosphors on the wavelength conversion modules due to excessively high light intensity is avoided, and meanwhile it is avoided to cause a burn (or burn mark) to spoil the phosphors, and the first converted beam 223A and the second converted beam 223B with high intensity are obtained. Therefore, the illumination system 200B of the embodiment may provide a light source with high brightness and high quality, and since two converted beams (the first converted beam 223A and the second converted beam 223B) with high intensity may be obtained through one excitation light source 222C, the cost of the excitation light source is saved. Moreover, in the projection apparatus 100B of the embodiment, the beam generated by the emission of the illumination system 200B and the conversion of the light valve 300 to form the image beam 301 has high brightness, and the image beam 301 is projected by the image-forming system 400 to form a good image with high brightness on a projection screen.

Figure 5:
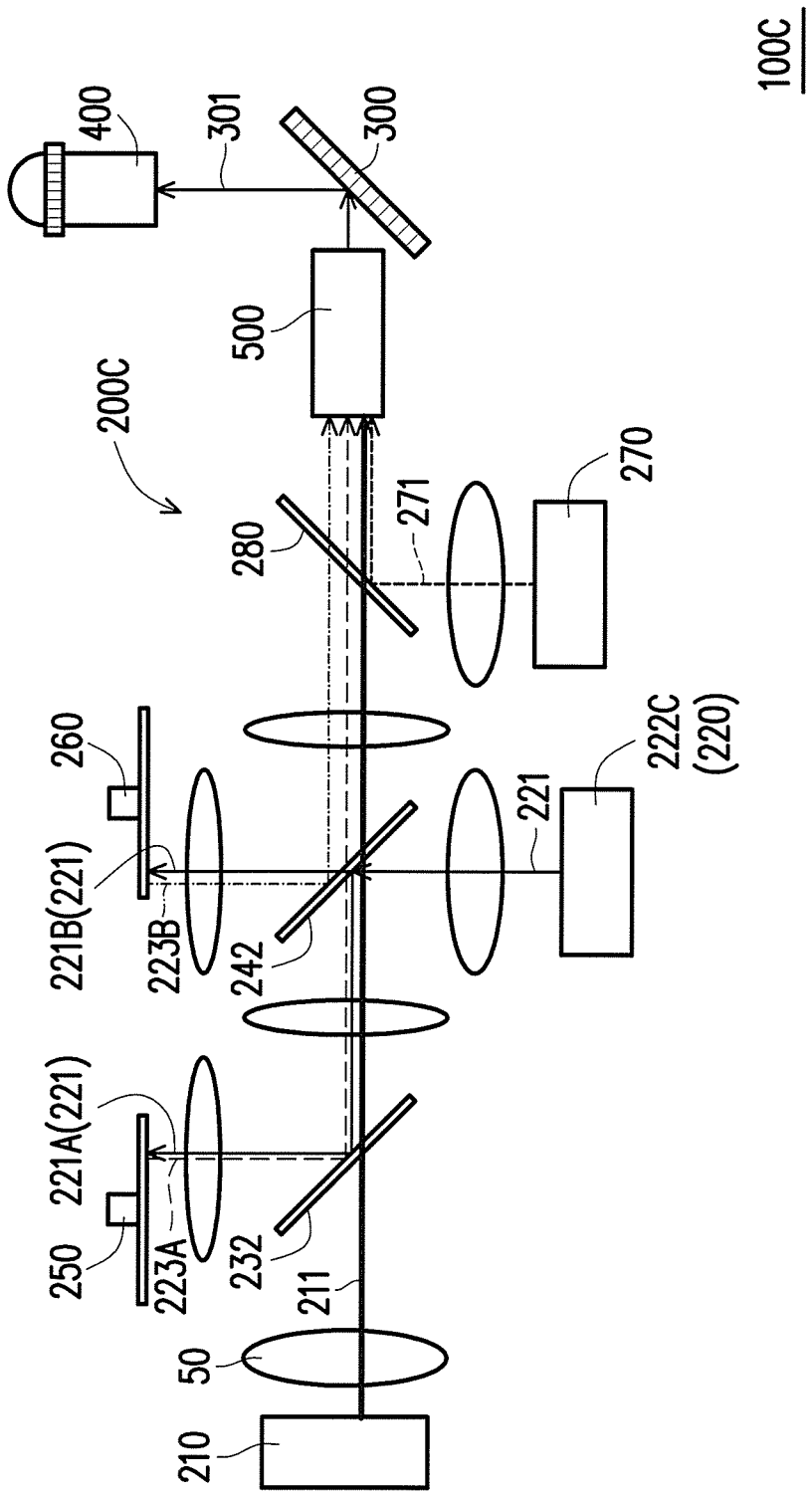
FIG. 5 is a schematic diagram of a projection apparatus according to a third embodiment of the invention.

Referring to FIG. 5, in the third embodiment of the invention, the projection apparatus 100C is similar to the aforementioned projection apparatus 100B, and an illumination system 200C is similar to the aforementioned illumination system 200B, though a difference therebetween is that in the embodiment, the second dichroic unit 242 splits the excitation beam 221 into the first partial beam 221A and the second partial beam 221B, and the first dichroic unit 232 is disposed on a transmission path of the first partial beam 221A coming from the second dichroic unit 242.

In other words, referring to FIG. 5, in the illumination system 200C of the third embodiment of the invention, the second dichroic unit 242 has splitting effect with a partial transmissive light and partial reflective light for the excitation beam 221 (for example, the second blue beam with a wavelength of 448 nm) without having a dichroic effect, though the second dichroic unit 242 has the dichroic effect (i.e., to be pervious to beams with certain wavelength(s), and to reflect beams with other certain wavelength(s)) for the first beam 211 (for example, the first blue beam with a wavelength of 462 nm), the first converted beam 223A, and the second converted beam 223B. In the embodiment, a part of the excitation beam 221 reflected by the second dichroic unit 242 becomes the first partial beam 221A, and the first partial beam 221A is reflected by the first dichroic unit 232 to reach the first wavelength conversion module 250; and a part of the excitation beam 221 passing through the second dichroic unit 242 becomes the second partial beam 221B transmitted to the second wavelength conversion module 260. Namely, in the embodiment, the first dichroic unit 232 is pervious to the first beam 211, and is adapted to reflect the first converted beam 223A and the first partial beam 221A; and the second dichroic unit 242 is pervious to the first beam 211, the second partial beam 221B, and the first converted beam 223A, and is adapted to reflect the second converted beam 223B.

Referring to FIG. 5, according to the above description, it is known that in the third embodiment of the invention, the illumination system 200C may provide a light source with high brightness and high quality through the first dichroic unit 232 and the second dichroic unit 242, and since two converted beams with high intensity (the first converted beam 223A and the second converted beam 223B) may be obtained through one excitation light source 222C, the cost of the excitation light source is saved. Moreover, in the embodiment, by using one excitation light source 222C in collaboration with two dichroic units (the first dichroic unit 232 and the second dichroic unit 242), two converted beams (the first converted beam 223A and the second converted beam 223B) are produced, so that the cost and space used for configuring other optical components are saved, so as to achieve a cost-saving effect and a miniaturization effect. In addition, in the projection apparatus 100C of the embodiment, the beam generated by the emission of the illumination system 200C and the conversion of the light valve 300 to form the image beam 301 has high brightness, and the image beam 301 is projected by the image-forming system 400 to form a good image with high brightness on a projection screen.

Referring to FIG. 1, FIG. 4 and FIG. 5, in the aforementioned embodiments or other embodiments, the illumination system may also include a plurality of lenses 50, and the lenses 50 may be disposed between any two of the optical components. To be specific, in the embodiments of the invention, the lenses 50 may be convex lenses or concave lenses (for example, convex lenses are illustrated in figures) to implement a beam focusing/collimating or a beam spreading function.

In summary, in the illumination system provided by the embodiment of the invention, by using the first dichroic unit, the second dichroic unit, the first wavelength conversion module, and the second wavelength conversion module, while intensity of the light beam provided by the illumination system is enhanced, intensities of the light beams irradiating the wavelength conversion modules are avoided to be excessively high. Moreover, by using different wavelength conversion modules, the illumination system according to the embodiments of the invention may enhance the intensity of each of the converted beams, or further adjust the intensity of each of the converted beams, so as to improve the quality of the light beam provided by the illumination system. By using the aforementioned illumination system, the projection apparatus according to the embodiments of the inventions may provide images with high brightness and high quality. In other embodiments of the invention, a color weight of each converted beam may be adjusted by using the corresponding wavelength conversion module in collaboration with the excitation light source. In this way, the projection apparatus may be applied to various usage environments or situations.

The foregoing description of the preferred embodiments of the invention has been presented for purposes of illustration and description. It is not intended to be exhaustive or to limit the invention to the precise forms or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first," "second," etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projection apparatus, comprising:
    an illumination system, comprising:
        a first light source, emitting a first beam;
        an excitation light source module, emitting an excitation beam;
        a first dichroic filter and a second dichroic filter, disposed on a transmission path of the excitation beam, wherein the first dichroic filter is further disposed on a transmission path of the first beam, and the second dichroic filter is further disposed on a transmission path of the first beam coming from the first dichroic filter;
        a first wavelength conversion module, disposed on a transmission path of a first partial beam of the excitation beam coming from the first dichroic filter, and converting the first partial beam into a first converted beam transmitted back to the first dichroic filter, wherein the second dichroic filter is further disposed on a transmission path of the first converted beam coming from the first dichroic filter, wherein the first wavelength conversion module comprises a first phosphor layer, and the first phosphor layer has a circular segment near 180-degree arc shape;
        a second wavelength conversion module, disposed on a transmission path of a second partial beam of the excitation beam coming from the second dichroic filter, and converting the second partial beam into a second converted beam transmitted back to the second dichroic filter, wherein the second wavelength conversion module comprises a second phosphor layer, and the second phosphor layer has a circular segment near 180-degree arc shape;
        a second light source, emitting a second beam; and
        a third dichroic filter, disposed on transmission paths of the second beam and the first beam, the first converted beam, and the second converted beam coming from the second dichroic filter;
    a light valve, converting the first beam, the first converted beam, the second converted beam, and the second beam coming from the third dichroic filter into an image beam; and
    an image-forming system, disposed on a transmission path of the image beam,
    wherein the first wavelength conversion module and the second wavelength conversion module are reflective wavelength conversion wheels, the first beam is a first blue beam, the excitation beam is a second blue beam, and a wavelength of the first blue beam is different from a wavelength of the second blue beam, and wherein when the first partial beam of the excitation beam illuminates the first phosphor layer converting to the first converted beam, the second partial beam of the excitation beam does not illuminate the second phosphor layer, and when the second partial beam of the excitation beam illuminates the second phosphor layer converting into the second converted beam, the first partial beam of the excitation beam does not illuminate the first phosphor layer,
    wherein the second dichroic filter has splitting effect and has no dichroic effect for the excitation beam, and the second dichroic filter has the dichroic effect for the first beam, the first converted beam, and the second converted beam.

2. The projection apparatus as claimed in claim 1, wherein the excitation light source module comprises:
    a first excitation light source, emitting the first partial beam of the excitation beam, wherein the first dichroic filter is disposed on a transmission path of the first partial beam; and
    a second excitation light source, emitting the second partial beam of the excitation beam, wherein the second dichroic filter is disposed on a transmission path of the second partial beam.

3. The projection apparatus as claimed in claim 1, wherein the excitation light source module comprises:
    an excitation light source, emitting the excitation beam;
    a beam splitting unit, disposed on the transmission path of the excitation beam, and splitting the excitation beam into the first partial beam and the second partial beam, wherein the second dichroic filter is disposed on a transmission path of the second partial beam coming from the beam splitting unit; and
    a reflecting unit, disposed on a transmission path of the first partial beam coming from the beam splitting unit, and reflecting the first partial beam coming from the beam splitting unit to the first dichroic filter.

4. The projection apparatus as claimed in claim 3, wherein a part of the excitation beam reflected by the beam splitting unit becomes the first partial beam, and a part of the excitation beam passing through the beam splitting unit becomes the second partial beam.

5. The projection apparatus as claimed in claim 1, wherein the second dichroic filter splits the excitation beam into the first partial beam and the second partial beam, and the first dichroic filter is further disposed on a transmission path of the first partial beam coming from the second dichroic filter.

6. The projection apparatus as claimed in claim 1, wherein the first beam sequentially passes through the first dichroic filter, the second dichroic filter, and the third dichroic filter, the first converted beam is first reflected by the first dichroic filter and sequentially passes through the second dichroic filter and the third dichroic filter, the second converted beam is reflected by the second dichroic filter and then passes through the third dichroic filter, and the second beam is reflected by the third dichroic filter.

7. The projection apparatus as claimed in claim 6, wherein the first partial beam passes through the first dichroic filter and is then transmitted to the first wavelength conversion module, and the second partial beam passes through the second dichroic filter and is then transmitted to the second wavelength conversion module.

8. The projection apparatus as claimed in claim 6, wherein a part of the excitation beam reflected by the second dichroic filter becomes the first partial beam, the first partial beam is reflected to the first wavelength conversion module by the first dichroic filter, and a part of the excitation beam passing through the second dichroic filter becomes the second partial beam transmitted to the second wavelength conversion module.

9. The projection apparatus as claimed in claim 1, wherein the first light source, the excitation light source module, and the second light source are laser light sources with different lighting wavelengths.

10. The projection apparatus as claimed in claim 1, wherein the first wavelength conversion module and the second wavelength conversion module are phosphor wheels with different colors of phosphors.

11. An illumination system, comprising:
a first light source, emitting a first beam;
an excitation light source module, emitting an excitation beam;
a first dichroic filter and a second dichroic filter, disposed on a transmission path of the excitation beam, wherein the first dichroic filter is further disposed on a transmission path of the first beam, and the second dichroic filter is further disposed on a transmission path of the first beam coming from the first dichroic filter;
a first wavelength conversion module, disposed on a transmission path of a first partial beam of the excitation beam coming from the first dichroic filter, and converting the first partial beam into a first converted beam transmitted back to the first dichroic filter, wherein the second dichroic filter is further disposed on a transmission path of the first converted beam coming from the first dichroic filter, wherein the first wavelength conversion module comprises a first phosphor layer, and the first phosphor layer has a circular segment near 180-degree arc shape;
a second wavelength conversion module, disposed on a transmission path of a second partial beam of the excitation beam coming from the second dichroic filter, and converting the second partial beam into a second converted beam transmitted back to the second dichroic filter, wherein the second wavelength conversion module comprises a second phosphor layer, and the second phosphor layer has a circular segment near 180-degree arc shape;
a second light source, emitting a second beam; and
a third dichroic filter, disposed on transmission paths of the second beam and the first beam, the first converted beam, and the second converted beam coming from the second dichroic filter,
wherein the first wavelength conversion module and the second wavelength conversion module are reflective wavelength conversion wheels, the first beam is a first blue beam, the excitation beam is a second blue beam, and a wavelength of the first blue beam is different from a wavelength of the second blue beam, and wherein when the first partial beam of the excitation beam illuminates the first phosphor layer converting to the first converted beam, the second partial beam of the excitation beam does not illuminate the second phosphor layer, and when the second partial beam of the excitation beam illuminates the second phosphor layer converting into the second converted beam, the first partial beam of the excitation beam does not illuminate the first phosphor layer,
wherein the second dichroic filter has no splitting effect and has no dichroic effect for the excitation beam, and the second dichroic filter has the dichroic effect the first beam, the first converted beam, and the second converted beam.

12. The illumination system as claimed in claim 11, wherein the excitation light source module comprises:

a first excitation light source, emitting the first partial beam of the excitation beam, wherein the first dichroic filter is disposed on a transmission path of the first partial beam; and
a second excitation light source, emitting the second partial beam of the excitation beam, wherein the second dichroic filter is disposed on a transmission path of the second partial beam.

13. The illumination system as claimed in claim 11, wherein the excitation light source module comprises:
an excitation light source, emitting the excitation beam;
a beam splitting unit, disposed on the transmission path of the excitation beam, and splitting the excitation beam into the first partial beam and the second partial beam, wherein the second dichroic filter is disposed on a transmission path of the second partial beam coming from the beam splitting unit; and
a reflecting unit, disposed on a transmission path of the first partial beam coming from the beam splitting unit, and reflecting the first partial beam coming from the beam splitting unit to the first dichroic filter.

14. The illumination system as claimed in claim 13, wherein a part of the excitation beam reflected by the beam splitting unit becomes the first partial beam, and a part of the excitation beam passing through the beam splitting unit becomes the second partial beam.

15. The illumination system as claimed in claim 11, wherein the second dichroic filter splits the excitation beam into the first partial beam and the second partial beam, and the first dichroic filter is further disposed on a transmission path of the first partial beam coming from the second dichroic filter.

16. The illumination system as claimed in claim 11, wherein the first beam sequentially passes through the first dichroic filter, the second dichroic filter, and the third dichroic filter, the first converted beam is first reflected by the first dichroic filter and sequentially passes through the second dichroic filter and the third dichroic filter, the second converted beam is reflected by the second dichroic filter and then passes through the third dichroic filter, and the second beam is reflected by the third dichroic filter.

17. The illumination system as claimed in claim 16, wherein the first partial beam passes through the first dichroic filter and is then transmitted to the first wavelength conversion module, and the second partial beam passes through the second dichroic filter and is then transmitted to the second wavelength conversion module.

18. The illumination system as claimed in claim 16, wherein a part of the excitation beam reflected by the second dichroic filter becomes the first partial beam, the first partial beam is reflected to the first wavelength conversion module by the first dichroic filter, and a part of the excitation beam passing through the second dichroic filter becomes the second partial beam transmitted to the second wavelength conversion module.

19. The illumination system as claimed in claim 11, wherein the first light source, the excitation light source module, and the second light source are laser light sources with different lighting wavelengths.

20. The illumination system as claimed in claim 11, wherein the first wavelength conversion module and the second wavelength conversion module are phosphor wheels with different colors of phosphors.

21. The illumination system as claimed in claim 11, wherein one of the first converted beam and the second converted beam is a green beam, the other one of the first converted beam and the second converted beam is a yellow beam, and the second beam is a red beam.

22. The illumination system as claimed in claim 11, wherein the third dichroic filter combines the first beam, the first converted beam, the second converted beam, and the second beam.

23. The illumination system as claimed in claim 11, further, comprising:
- a light uniforming element, disposed on transmission paths of the first beam, the first converted beam, the second converted beam, and the second beam coming from the third dichroic filter.

* * * * *